Jan. 29, 1946.  F. L. EIDMANN ET AL  2,393,761
TIME RECORDER
Filed May 10, 1941      5 Sheets-Sheet 1

INVENTORS.
Frank L. Eidmann
George C. Engel

Patented Jan. 29, 1946

2,393,761

UNITED STATES PATENT OFFICE 2,393,761

TIME RECORDER

Frank L. Eidmann, Princeton, and George C. Engel, Ridgewood, N. J., assignors to General Time Instruments Corporation, New York, N. Y., a corporation of Delaware Application May 10, 1941, Serial No. 392,883

15 Claims. (Cl. 234—53)

This invention relates to time recording and in particular to improvements in making a printed record from a time driven recording member.

This invention contemplates the use of a card or the like on which indicia have been printed. Means are provided to imprint or impress a mark on the card. The position of the mark with respect to the indicia may record the time of the operation, or it may record any function of time, depending on the kind of indicia employed.

This method of time recording permits the use of relatively simple and inexpensive mechanism, as contrasted with previously known time recorders which embody type wheels and costly actuating mechanism therefor.

This invention is of particular utility as applied to a job time recorder, although the invention herein disclosed is applicable to other types of time recorders as well.

A job time recorder is used principally in industrial establishments to record the elapsed time during the performance of a particular job, the record being made in order to compute the cost of the job by multiplying the amount of elapsed time by a factor representing cost per unit of time. The utility of the job time recorder embodying this invention is enhanced by the fact that the record may be made directly in terms of dollars, thus eliminating the intermediate step of calculation. Because of the simple and inexpensive construction of such a device one job time recorder may be provided at the place of work of each employee which results in a considerable saving of time, normally consumed in going from the employee's place of work to a centrally located job time recorder and returning each time he changes from one job to another.

That embodiment of this invention which is herein disclosed has been particularly designed for use as a job time recorder although the invention is not necessarily limited thereto. In this particular embodiment, the parts are so designed as to cooperate with each other in a fool-proof manner; that is, means are provided to prevent the removal of a card inserted in the recorder without recording the elapsed time thereon; means are also provided to prevent the insertion of another card in the recording mechanism without first resetting the mechanism to its initial position; furthermore means are provided to prevent the device from being rendered inoperative except under certain conditions.

An object of this invention is to provide an improved recording mechanism of inexpensive construction and of positive and efficient operation which is adapted to be driven by the ordinary clock mechanism.

Another object is to provide an improved method of recording time or a function thereof by impressing or imprinting a mark on a card or the like which has previously been provided with printed indicia.

A further object is to provide an improved recording mechanism which is not dependent upon a time controlled impulse and which does not embody movable type.

A further object of this invention is to provide improved mechanism for recording the position of a time driven rotatable member.

Still another object is to provide an improved job time recorder which is fool-proof in its operation.

A still further object is to provide an improved time recording device which prints a mark on a card provided with indicia previously printed thereon so that the record may be read from the card either in units of time or in other units which are a function of time.

Other objects, features and advantages of this invention will become apparent as this description proceeds.

With reference now to the drawings in which like reference numerals represent like parts—

Fig. 4 is a section taken along line 4—4 of Fig. 3;

Figure 1:
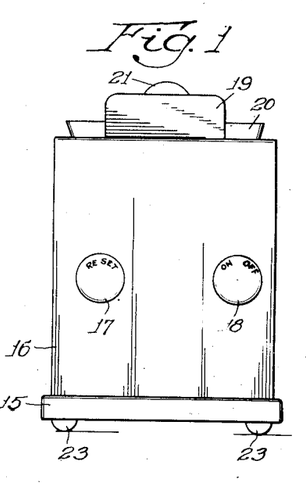
Fig. 1 is a front elevation of a preferred embodiment of this invention.
Figure 3:
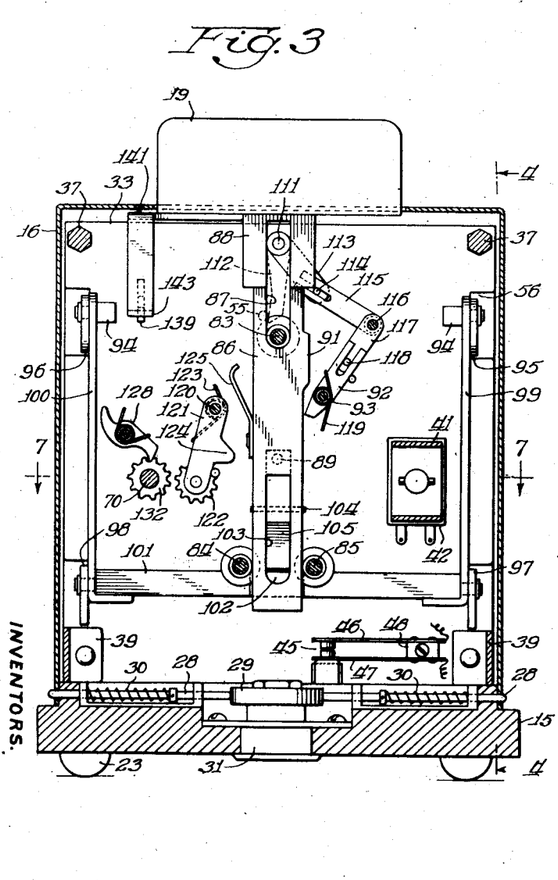
Fig. 3 is a section of the device shown in Fig. 1 taken along line 3—3 of Fig. 4; certain parts being omitted or broken away for the purposes of clarity in this and the succeeding views.

Referring now to Figs. 1, 3 and 4, reference numeral 15 indicates the wooden base of a job time recorder, on which base is mounted a casing 16. Extending outwardly from the front of the casing is a reset knob 17 and a knob 18 which actuates an electric switch to turn the device off and on. Extending upwardly from the top surface is a manually depressible actuating member 19, and a card guide 20, which is in the form of a hopper, having tapering walls so that a card 24 may be directed into the card receiving means locked within the housing. A lamp guard 21 is also mounted on the top of the casing 16 to protect an incandescent bulb 22. The base 15 is provided with suitable feet 23.

Figure 2:
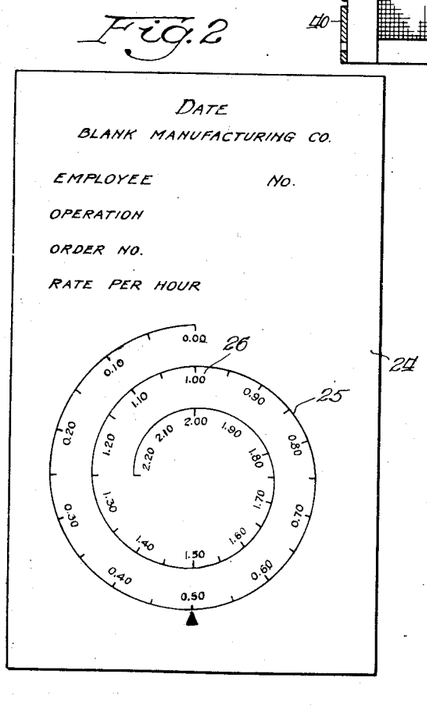
Fig. 2 is an elevation of a record card.

As shown in Fig. 2 the record card 24 is provided with a spiral line 25 at one surface thereof, and indicia 26 are printed along said line. Equal numerical increments along the spiral represent equal angular increments so that an impression made by a rotating recording member along the spirally arranged indicia will record the position of the recording member at the time that the impression is made. The indicia may indicate units of time, or may indicate a function of elapsed time. On the card shown, the indicia extend from 0.00 to 2.25 and are arranged along a spiral extending through two and a quarter complete revolutions. The card is designed for cooperation with a recording member which rotates at the rate of one revolution per hour, and for indicating the labor cost of a particular operation at the rate of one dollar per hour.

Disposed within the casing 16 are several groups of elements including card receiving means and a recording member adjacent thereto. Time responsive driving means are provided for the recording member, as well as a manual driving or resetting means which is actuated by knob 17. Means are also provided for imparting a quick operative stroke to the recording member to impress a mark on the card, this means being actuated by the manually depressible member 19. Other means are provided to control the operation of the above mentioned groups of elements to insure fool-proof operation, and locking means are incorporated in the base 15 to secure the casing 16 thereto to prevent tampering.

Slidably mounted in the base 15 are locking pins 28 which extend outwardly through the apertured lower portion of the casing 16 which overlaps the base. An actuating cam 29 is rotatably mounted on the base to hold the pins outwardly against the bias of the springs 30. A suitable cylinder lock 31 is also mounted in the base in order that cam 29 may be locked in position with the pins 28 extending outwardly through the casing. This prevents the casing from being removed, and the mechanism from being tampered with.

Figure 5:
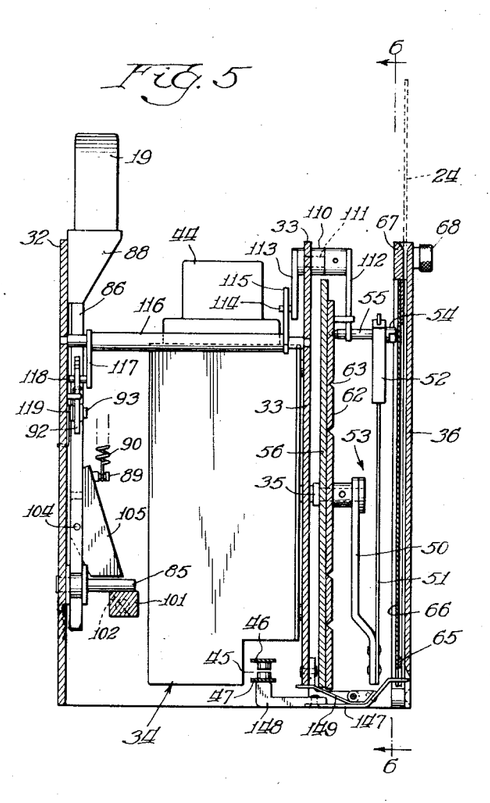
Fig. 5 is a section of the mechanism with the casing removed taken along line 5—5 of Fig. 6.
Figures 7, 8, 9:
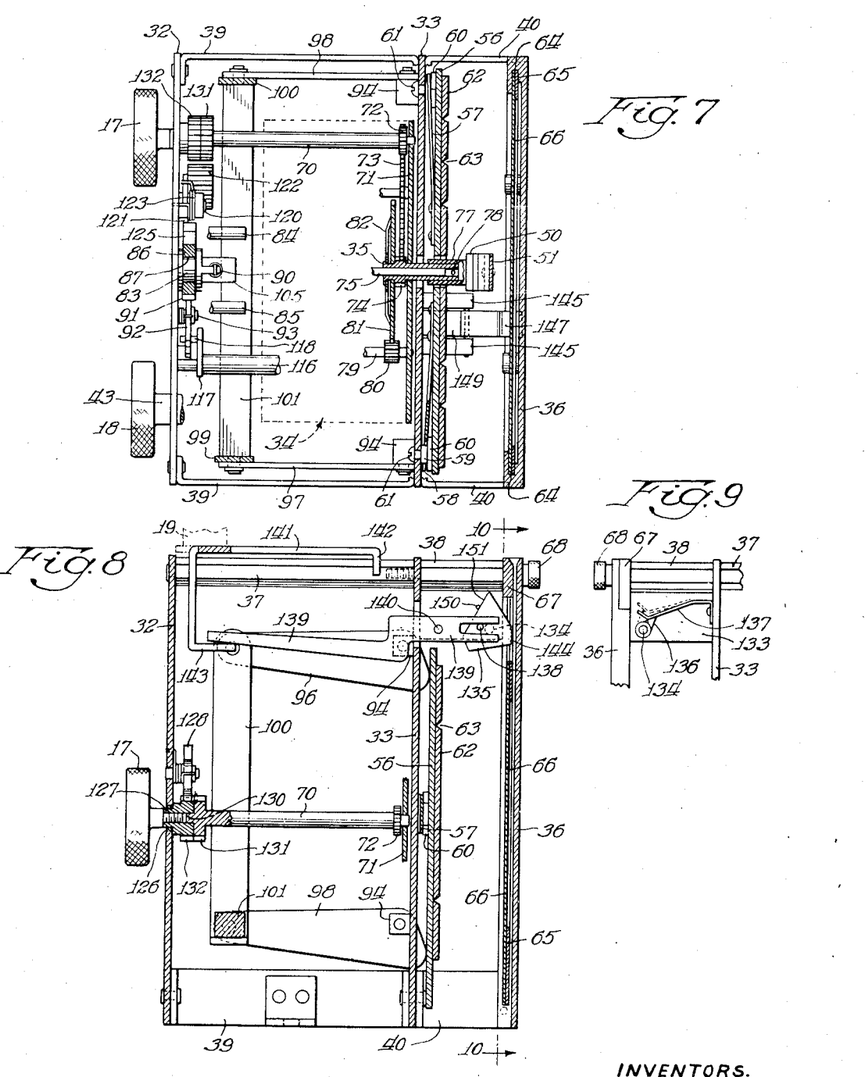
Fig. 7 is a section taken along line 7—7 of Fig. 3.
Fig. 8 is a section taken along line 8—8 of Fig. 6.
Fig. 9 is an elevation taken along line 9—9 of Fig. 6.
Figure 10:
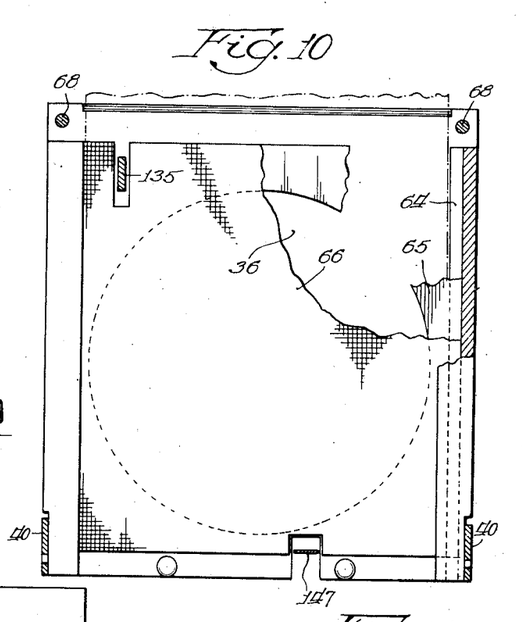
Fig. 10 is a section taken along line 10—10 of Fig. 8.
Figure 11:
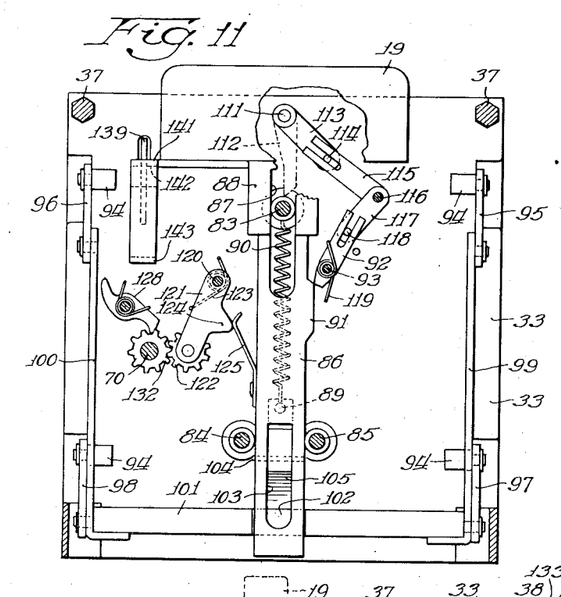
Fig. 11 is a section similar to Fig. 3 but showing the parts in a changed position.

Mounted on the base is a front plate 32, an intermediate plate 33 and a rear plate 36, the front and intermediate plates 32 and 33 being secured to each other at their upper corners by means of pillars 37, and at their lower corners by means of frame members 39. The rear plate 36 is secured with respect to the intermediate plate 33 by means of pillars 38 connecting the upper corners of each and by means of frame members 40 at the lower corners. A suitable clock mechanism, indicated generally by reference numeral 34 as shown in Figs. 5 and 7, is located between the front and intermediate plates. The clock mechanism herein disclosed is actuated by a self-starting synchronous electric clock motor, although the usual spring wound clockwork may be substituted therefor if desired. The usual minute sleeve 35 extends rearwardly from the clock mechanism through the intermediate plate, the minute sleeve being frictionally associated with the clock motor so that the angular position of the sleeve may be manually set or adjusted.

The clock motor circuit is controlled both by a manually operated switch 42 and by automatically operated contacts 45 which are connected in series circuit with each other and with the motor. The switch 42 is mounted on a bracket 41, extending rearwardly of the front plate 32. A switch shaft 43 extends forwardly through the front plate and the casing, and is associated with the switch knob 18. The contacts 45 are mounted on resilient contact arms 46 and 47 which are secured to an insulating block 48. The latter is affixed to the lower portion of the intermediate plate 33. The light bulb 22 is screwed into a socket 44 of the usual type, which may be suitably mounted on the clock mechanism, and the bulb is connected in series with the clock motor to indicate the operative condition of the device.

The recording member 53 comprises an arm 50 secured to the minute sleeve 35, and carrying at its outer end, a resilient member 51 which extends in the opposite direction. A block 52 is slidably mounted on the resilient member 51 and is provided with a small pin 54 which extends rearwardly therefrom. The block is also provided with a forwardly extending pin 55, the forward end of which is adapted to bear against a plate 56 which is resiliently mounted on the intermediate plate 33 for rearward displacement.

As shown in Fig. 7, the plate 56 is provided with a plurality of leaf springs 57 which are riveted thereto and the outer ends 58 of which are forked. Screws 61 extend through the intermediate plate and are provided with nuts 60 which are threaded onto the screws, and with spacers 59 which hold the nuts 60 spaced from the rear surface of the intermediate plate. The forked ends 58 of the leaf springs extend on either side of the spacers 59 and engage the same to hold the plate 56 in position. It will be seen that this resilient mounting permits the plate to be bodily displaced rearwardly without any rotation thereof. A guide plate 62 is suitably secured to the plate 56, and is formed with a spiral slot 63 therein which engages the pin 55, and thereby holds the block 52 in a given radial position.

As shown in Figs. 5 and 7, the card receiving means includes the rear plate 36 which is provided with a channel 64 at either side thereof, in which channel a frame 65 is removably disposed. An ink impregnated fabric or ribbon 66 is stretched across the frame and secured thereto. Across the top of the frame is positioned a horizontal member 67 which holds the frame in place. It will be noted that the upper edge of the horizontal member is bevelled and cooperates with a corresponding bevelled edge of the rear plate 36 to facilitate the insertion of the card 24 into the space between the ribbon 66 and the rear plate. The rear plate and the member 67 are held in position by means of suitable screws 68 which take into the pillars 38.

It will be seen that as the recording member 53 is rotated by the clock mechanism, the block 52 will be caused to pursue a spiral path due to the co-action of the pin 55 and the spirally slotted guide plate 62. When the plate 56 is displaced rearwardly, it causes the pin 54 to contact the ribbon 56 so that a mark will be impressed on the card 24.

The driving and setting means for the recording member are shown in detail in Fig. 7. A setting shaft 70 has one end thereof journalled in a frame member 71 of the clock mechanism 34. A pinion 72 is secured to the setting shaft and meshes with a wheel 73, which wheel drives a pinion 74 which is formed on the minute sleeve 35.

The minute sleeve 35 in turn is rotatably mounted on a suitable shaft 75. A sleeve 77, which carries the arm 50, is pinned to the sleeve 35 by means of a pin 78. The shaft 79 is driven by the clock mechanism 34 through suitable reduction gears, and is provided with a pinion 80 which meshes with a wheel 81 which is rotatably mounted on the sleeve 35. A spider 82 is keyed to the minute sleeve 35 and frictionally engages the wheel 81. It will be seen therefore that the clock mechanism 34 drives the minute sleeve through the spider 82, and that the angular position of the minute sleeve and of the recording member may be manually adjusted by rotating the setting shaft 70 in the usual manner.

The means for displacing the plate 56 so as to impart a printing stroke to the recording member 53, comprises the manually depressible actuating member 19 which is secured to a bracket 88 mounted on a vertically sliding member 86. Extending rearwardly from the front plate 32 are headed guide members 83, 84 and 85 which are shown in Fig. 3. The vertically sliding member 86 is slotted as shown at 87, and the headed guide member 83 extends through the slot and holds the sliding member 86 against the front plate 32. The headed guide members 84 and 85 are disposed at either side of the sliding member toward the lower portion thereof. A pin 89 is associated with the vertically sliding member 86, and a spring 90 extends between the pin 89 and the guide member 83 so as to urge upwardly the vertically sliding member 86 together with the manual member 19.

One side edge of the sliding member 86 is provided with a projection 91 which projection is adapted to be engaged by a pawl 92 mounted on a stud 93 in the front plate. The pawl is biased by a spring 119 into operative position, so that when the sliding member 86 is displaced, it will remain locked in its displaced position.

Blocks 94 are secured to the forward surface of the intermediate plate 33 near the corners thereof and the intermediate plate is cut away adjacent the blocks, as shown in Fig. 4. Levers 95, 96, 97, and 98 are pivotally mounted on the blocks 94, each lever extending forwardly into the proximity of the front plate 32, and having a small portion extending rearwardly through the cutaway portion of the intermediate plate and bearing against the plate 56. The levers 95 and 97 are linked together at their outer ends by link 99, and the levers 96 and 98 are similarly linked together by link 100. A cross-bar 101 extends between the levers 97 and 98 so that the entire system may be displaced downwardly by the application of pressure to the cross-bar in order to displace the plate 56 rearwardly.

The sliding member 86 is provided with a pawl 105 which is adapted to engage the cross-bar 101.

Figure 12:
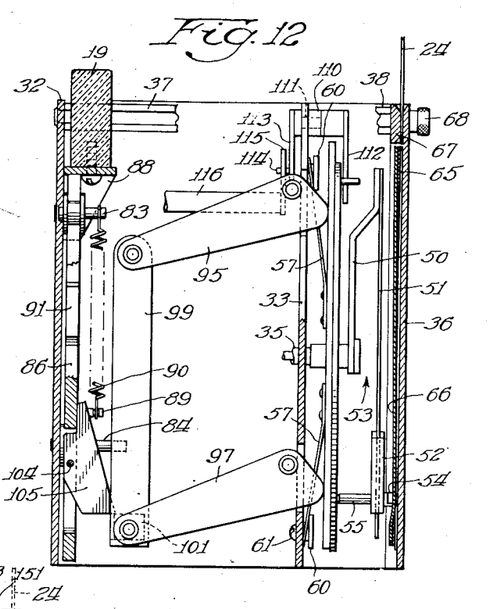
Fig. 12 is a section similar to Fig. 5 but showing the parts in a changed position.
Figure 14:
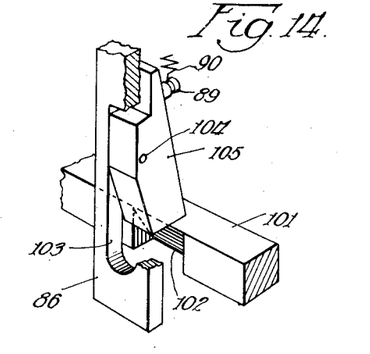
Fig. 14 is a detailed perspective view of certain of the parts.

The pawl is mounted on a pivot pin 104 which extends across a slotted portion 103 in the member 86. The pin 89 is mounted on the pawl 105 so that the spring 90 urges the pawl rearwardly into a position wherein it will engage the cross-bar 101. As the cross-bar is displaced downwardly it also moves rearwardly out of the path of the pawl so that just after it reaches the position shown in Fig. 12 it will become clear of the pawl and snap back to its normal position due to the action of the springs 57. It will be noted that the guides 84 and 85 are extended rearwardly and determine the upper normal position of the cross-bar. The cross-bar is provided with a cammed surface 102 which facilitates the depression of the pawl into the slotted portion 103 as the sliding member 86 returns to its normal position (Fig. 14).

It will be seen that as the actuating member 19 and the sliding member 86 are displaced against the tension of the spring 90, that the lower edge of the pivoted member 105 engages the upper surface of the cross-bar 101 so as to force the linkage downwardly. As the levers 95, 96, 97 and 98 are rotated thereby the plate 56, which is engaged thereby at all four corners, is bodily displaced rearwardly against the bias of the leaf springs 57. Thus the printing operation is effected. Further displacement of the sliding member 86 into locked position will cause disengagement of the cross-bar 101 from the pawl 105 and release of the linkage. This release of the linkage permits the withdrawal of the recording member from contact with the ribbon so that the card may be readily withdrawn.

The sliding member 86 is maintained in its displaced position by the pawl 92 until such time as the pawl is released. The release of the pawl is effected by returning the recording member 53 to its starting position. As shown in Figs. 3 and 5, a bearing 110 is mounted near the upper edge of the intermediate plate 33, and a shaft 111 extends through said bearing and the plate. An arm 112 is pinned to the rear end of the shaft and extends down into the path of the pin 55, so that as the recording member is rotated into its starting position, the shaft will be displaced. To the forward end of the shaft 111 is secured a lever 113 which is provided with a pin 114 at its outer end. A shaft 116 is journalled in the plates 32 and 33 and carries a forked lever 115 at its rearward end which is adapted to be engaged by the pin 114. At its forward end, the shaft carries a lever 117 which is provided with a pin 118 which engages the forked portion of the pawl 92. As the shaft 111 is displaced by the resetting of the recording member to its starting position, the pawl 92 will be disengaged from the projection 91 on the sliding member 86, thereby permitting return of the sliding member to its normal position.

As the sliding member moves upwardly, the pawl 105 is depressed into the slotted portion 103 as it rides over the cammed surface 102 of the cross-bar 101. The relationship of these parts in their normal position is shown more clearly in Fig. 14.

The means to render the resetting means operative only when the vertically sliding member 86 is locked in its displaced position is shown in Figs. 3 and 8. A stud 120 is mounted on the rear surface of the front plate 32, and a lever 121 is pivoted thereon. A pinion 122 is rotatably mounted in the outer end of the lever, and a suitable spring 123 biases the lever toward the vertically sliding member 86. The lever 121 is also provided with a projection 124 which is adapted to be engaged by an arm 125 mounted on the sliding member 86 so that when the sliding member is displaced, the lever is thrown outwardly.

A bearing 126 is mounted in the front plate 32 and a short interiorly threaded hollow shaft 127 extends through the bearing and is suitably associated therewith so as to be secure against axial displacement. The knob 17 is screw threaded into the hollow shaft 127. The setting shaft 70 is provided with an end portion 130 of reduced diameter which is received in the hollow shaft 127, so that in effect the setting shaft 70 and the hollow shaft 127 can be considered as a split shaft. Pinions 131 and 132 are secured to the two halves of the split shaft in side by side relationship.

When the vertically sliding member 86 is in its normal elevated position the knob 17 may be rotated manually without affecting the setting shaft 70. However, when the sliding member is locked in its displaced position, the lever 121 is thrown outwardly so that the pinion 122, which is of a width equal to the combined widths of the pinion 131 and 132, will mesh with the latter pinions, and cause the two shafts 70 and 127 to be locked to each other. At this time therefore, rotation of the knob 17 will cause the recording member to be reset to its starting position. A click 128 prevents rotation of the pinion 132 in the reverse direction.

Figure 6:
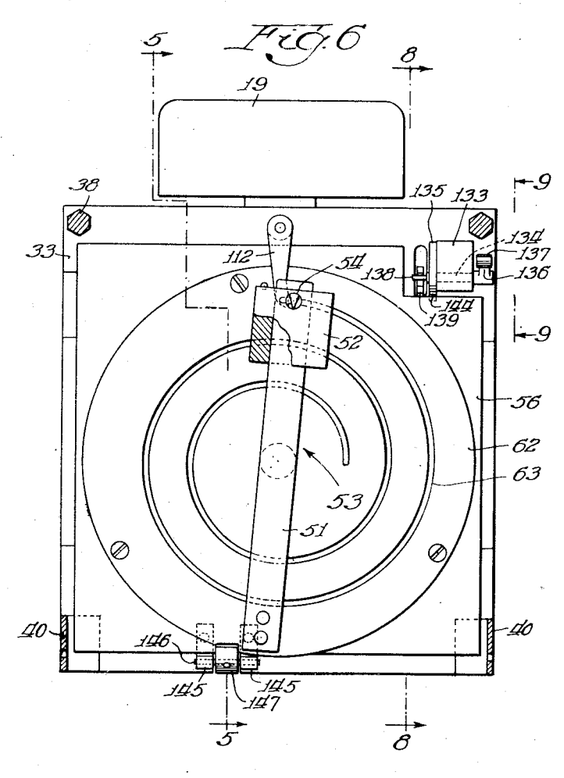
Fig. 6 is a section taken along line 6—6 of Fig. 5.

Means are provided to prevent the withdrawal of the card before the printing operation, and also to prevent the insertion of another card before the device is reset. As shown in Figs. 6, 8 and 9, a block 133 is suitably secured to the intermediate plate 33, and a shaft 134 extends through this block. A lock plate 135 is secured to the shaft 134 at one side of the block, and a small cam 136 is secured to the shaft at the other side of the block. A spring 137 is mounted on the intermediate plate 33, and its remote end contacts the cam 136 in an over-center relationship to cause the plate to assume either one of two positions. A pin 150 projects from the surface of the block and determines the uppermost position of the plate. The lower position of the plate is determined by the abutting of the corner portion 151 of the plate against the rear plate 36.

Figure 13:
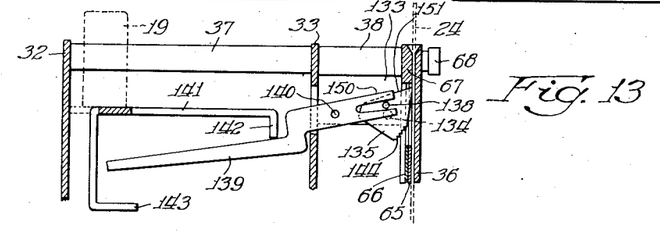
Fig. 13 is a detailed section of certain of the parts shown in Fig. 8 in a changed position.

A pin 138 extends outwardly from the plate 135 and is engaged by the forked end of a lever 139. The lever is pivoted on a pivot pin 140 which extends outwardly from the side surface of the block 133, and the forward-most end of the lever is extended into the proximity of the front plate 32. The manually depressible actuating member 19 has secured to it a U-shaped frame 141 which frame is provided with a rearwardly extending upper arm 142 and a lower arm 143. It will be seen that when the actuating member 19 is depressed, the upper arm 142 engages the lever 139 and causes the lock plate 135 to be rotated from its upper position as shown in Fig. 8 to its lower position as shown in Fig. 13. In its lowered position the corner 151 contacts the card 24, and after the card has been withdrawn from the card receiving elements comprising the rear plate 36 and its associated parts, the spring 137 causes the lock plate to bear against the rear plate 36, thereby blocking the slot through which a card may be inserted. This prevents the insertion of another card until the apparatus has been reset.

Upon the resetting of the apparatus so that the vertically sliding member 86 is released and returns to its normal upwardly extending position, the lower arm 143 engages the lever 139 and causes the lock plate to be rotated into its upper position as shown in Fig. 8. It will be noted that the lock plate is provided with a knurled portion 144 which, when the plate is in its upper position, extends into the path of a card which may be inserted. In this position, the lock plate does not prevent the insertion of a card, inasmuch as the card merely rotates the lock plate downwardly to a small degree. However, when the card has been inserted, the spring 137 urges the knurled portion 144 of the lock plate against the card so that any attempt to withdraw the card will cause the knurled portion to be wedged tightly against the card surface. It will be noted that the lower arm 143 is so disposed that it does not engage the lever 139 to trip the lock plate 135 until such time as the cross-bar 101 has cleared the pawl 105. This arrangement prevents withdrawal of the card before the position of the recording member has been imprinted on the card.

The means for actuating the contacts 45 in order to control the operation of the clock motor is shown in Figs. 5, 6 and 7. Two arms 145 are secured to the lower portion of the intermediate plate 33, and a pivot pin 146 is mounted in the arms. A lever 147 is rotatably mounted on the pivot pin, and one end of the lever extends into the path of the card 24 inserted into the card receiving means. The other end of the lever carries an insulating block 148 which is adapted to be raised against the lower spring arm 47 to close the contacts when the lever 147 has been contacted by a card. A spring member 149 is suitably secured to the lever 147 and engages a portion of the intermediate plate 33 in order to bias the lever 147 away from the contacts 45.

It will be seen that the circuit to the motor is automatically closed as soon as a card is inserted in the recording mechanism, and the circuit is opened upon the withdrawal of the card.

The operation of the recording mechanism has been above described in detail in connection with the operation of its several groups of elements. The insertion of a record card automatically closes the motor circuit and causes the recording member 53 to be rotated. The lock plate 135 prevents withdrawal of the card until the printing operation has been performed. At the termination of the interval which is desired to be measured the operator depresses the manual actuating member 19 which causes a quick operative stroke to be imparted to the recording member 53. This causes a mark to be made along the spiral 25 of the card, thereby recording either the duration of the elapsed time interval, or a function thereof. At the same time the lock plate 135 is tripped to release the card, and to prevent insertion of another card until the recording member is reset to its starting position. As the card is withdrawn, the motor circuit is automatically opened. The recording member however remains in its displaced position, and rotation of the setting knob 17 will return it to its starting position. As the recording member is reset, the pin 55 engages the arm 112 and causes the release of the vertically sliding member 86. As the member 86 returns to its normal upwardly extended position, the pinion 122 is disengaged from the pinion 131 and 132 so that the position of the recording member can not be changed thereafter manually. At the same time the lock plate 135 is tripped into its upper position, thereby permitting the insertion of a new card.

The electric clock motor may also be shut off by the switch knob 18 at certain times, such as lunch or rest periods, so that non-productive time will not be recorded. The light bulb 22 indicates to the foreman whether such time is being recorded or not. The position of the recording member cannot be changed manually, however, at any time prior to the printing operation, whether the switch 42 is off or on.

It is understood that this invention is not limited to the preferred embodiment herein disclosed and shown, but that various changes or modifications in the construction shown, and in the size, shape and proportions of the various parts or elements thereof may be effected without departing from the spirit of this invention. This invention is limited only by the following claims.

We claim:

1. A recording mechanism comprising a recording member, card receiving means spaced therefrom, time responsive means to shift the relative position of said recording member and of said card receiving means, means to cause an imprint to be made by said recording member on a card disposed in said card receiving means to record their relative position, means to lock said card in said card receiving means during operation of said recording member by said time responsive means, means for resetting said recording member, and means for rendering said resetting means inoperative while said card is locked in operative position.

2. A recording mechanism comprising a recording member, card receiving means spaced therefrom, time responsive means to shift the relative position of said recording member and of said card receiving means, means to cause an imprint to be made by said recording member on a card disposed in said card receiving means to record their relative position, means operated by a card when inserted in said receiving means to lock said card in operative position during the shifting of said relative position by said time responsive means, and means for releasing said locking means after operation of said imprinting means.

3. A recording mechanism comprising a recording member, card receiving means spaced therefrom, time responsive means to shift the relative position of said recording member and of said card receiving means, means to cause an imprint to be made by said recording member on a card disposed in said card receiving means to record their relative position, means for resetting said recording member, and means for preventing the insertion of another card in said card receiving means after operation of said imprinting means and before operation of said resetting means.

4. Time recording mechanism comprising card receiving means, a plate mounted adjacent thereto for movement toward and away therefrom, guide means on said plate, a recording member mounted for sliding contact with said plate and guided by said guide means in a spiral path, means to advance said recording member at a constant angular speed along said spiral path, and means to bodily displace said plate so as to urge said recording member in an axial direction against said card receiving means.

5. A job time recorder comprising means to receive a card, recording means, driving means for said recording means, means to render said driving means operative only when a card is received in said receiving means, locking means to lock said card in said receiving means, said locking means rendered operative simultaneously with said driving means, and means to impress a record on said card and to release said locking means to permit withdrawal of said card.

6. A job time recorder comprising means to receive a card, recording means, driving means for said recording means, means to render said driving means operative only when a card is received in said receiving means, locking means to lock said card in said receiving means, means to press said recording means against said card and to release simultaneously said locking means, means to reset said recording means, and means to prevent the insertion of another card in said receiving means until after said recording means has been reset.

7. An elapsed time recorder comprising means to receive a card, recording means adapted to be advanced from an initial position, driving means for advancing said recording means, means for resetting said recording means to its initial position, means to render said driving means operative only when a card is received in said receiving means, locking means to lock said card in said receiving means, said locking means rendered operative simultaneously with said driving means, manually actuated means to impart a printing stroke to said recording means and to release said locking means, and means to render said resetting means inoperative until operation of said manually actuated means.

8. In a job time recorder, card receiving means including a backing plate, a pivoted member and an overcenter spring to bias said pivoted member into one of two positions whereby in one of said positions a card is prevented from being withdrawn from said card receiving means, and in the other of said positions, a card is prevented from being inserted into said card receiving means.

9. In a job time recorder, card receiving means including a backing plate, a pivoted member provided with two projections, means to bias said pivoted member into one of two positions wherein one or the other of said projections is urged against said backing plate, whereby in one of said positions, one projection engages said card below the pivot point of said pivoted member so that attempted withdrawal of the card causes said card to be wedged between said projection and said backing plate, and in the other of said positions, the other projection extends into the path of a card being inserted in said card receiving means to block further entrance thereof.

10. A recording mechanism comprising time responsive driving means, a recording member frictionally associated therewith, a manually depressible operating member therefor, means to latch said operating member in depressed position, means associated with said recording member for resetting the same only when said operating member is latched in depressed position, and means associated with said resetting means for release of said latching means.

11. A recording mechanism comprising time responsive driving means, a recording member frictionally associated therewith, manually operated means for imparting a quick printing stroke to said recording member, means associated with said recording member for resetting the same, said means comprising a split shaft, one-half of which is associated with said recording member and the other half of which is adapted to be rotated manually, and means for locking the two halves of said split shaft together upon operation of said printing means.

12. An elapsed time recorder comprising card receiving means, time recording means, a manually displaceable operating member for said time recording means, manual resetting means for said recording means, means controlled by said recording member when in displaced position for rendering said resetting means operative, and means operated by said recording means when reset to its initial position for releasing said operating member from displaced position.

13. A recording mechanism comprising time responsive driving means, a recording member frictionally associated therewith, manually operated means for imparting a quick printing stroke to said recording member, means associated with said recording member for resetting the same, said means comprising a split shaft, one half of which is associated with said recording member and the other half of which is adapted to be rotated manually, means for locking the two halves of said split shaft together upon operation of said printing means, and means controlled by said recording member when reset to its initial position for releasing said locking means.

14. A recording mechanism comprising timing mechanism, a recording member driven thereby, a card receiver, a manually operable member for operating said recording member to make an imprint on a card inserted in said receiver, means operative upon insertion of a card in said receiver for locking same against withdrawal, means responsive to the operation of said manual member for releasing said locking means, resetting means for said recording member rendered operative by the operation of said manual member, and means controlled by said recording member when reset to its initial position for releasing said manual member from operated position.

15. An elapsed time recorder comprising time responsive driving means, a recording member adapted to be advanced from an initial position by said driving means, a card receiver, a manually operable member for causing said recording member to make an imprint on a card inserted in said receiver, means for locking a card in said receiver rendered operative by the insertion of the card and released by the operation of said manual member to permit withdrawal of the card, and means for preventing insertion of a card into said receiver, said means rendered inoperative upon return of said manual member to normal position.

FRANK L. EIDMANN.
GEORGE C. ENGEL.